July 12, 1932.  J. A. WALLER  1,867,042
SAW CLAMP
Filed March 28, 1929   3 Sheets-Sheet 1
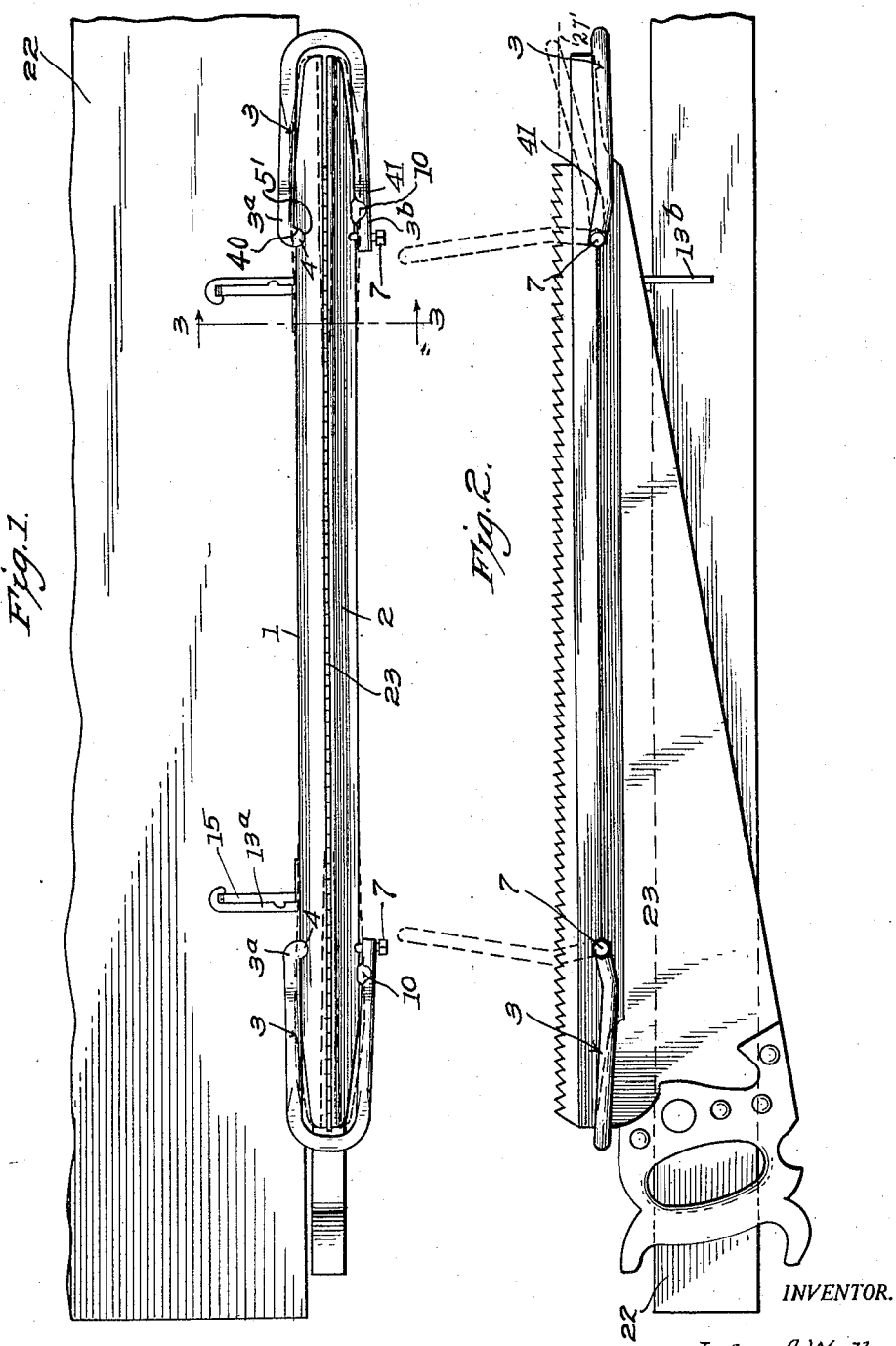
INVENTOR.
John A. Waller.
BY Arthur P. Knight
Alfred W. Knight
ATTORNEYS.

July 12, 1932.  J. A. WALLER  1,867,042
SAW CLAMP
Filed March 28, 1929  3 Sheets-Sheet 2
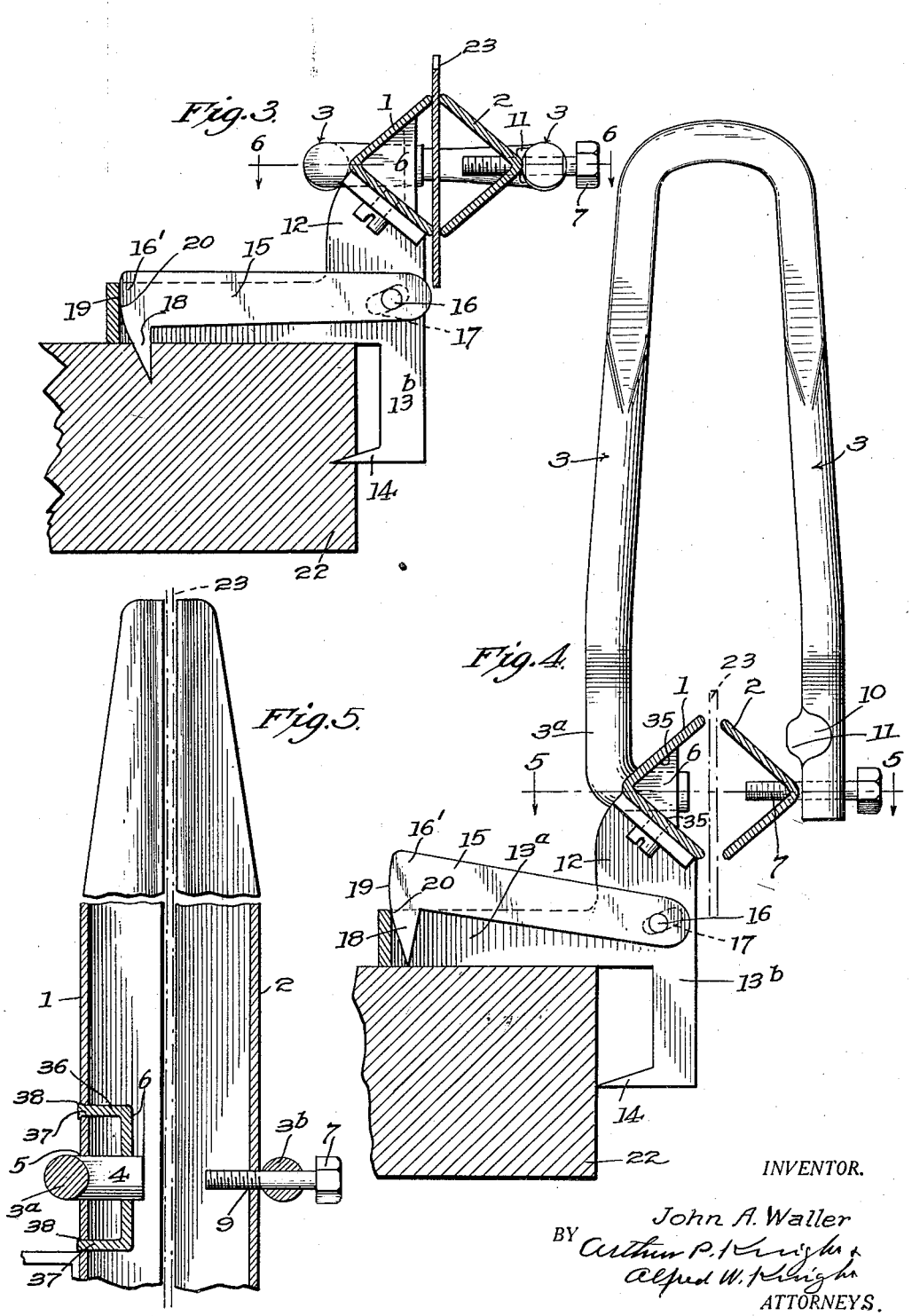
INVENTOR.
John A. Waller
BY Arthur P. Knight
Alfred W. Knight
ATTORNEYS.

July 12, 1932.  J. A. WALLER  1,867,042
SAW CLAMP
Filed March 28, 1929   3 Sheets-Sheet 3
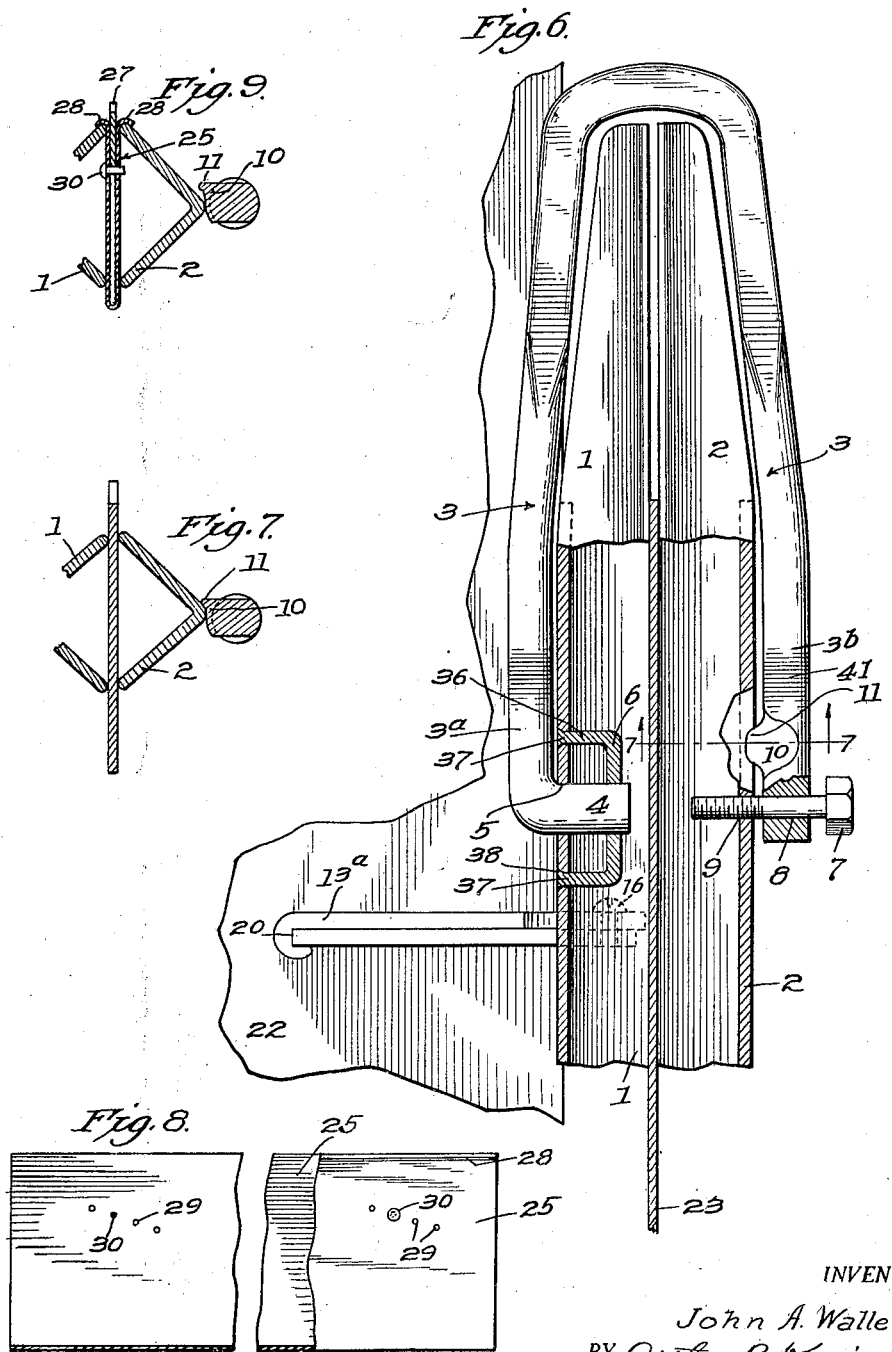

Patented July 12, 1932

1,867,042

UNITED STATES PATENT OFFICE

JOHN A. WALLER, OF BEVERLY HILLS, CALIFORNIA, ASSIGNOR TO WALLER MANUFACTURING CORPORATION, LTD., OF LOS ANGELES, CALIFORNIA, A CORPORATION OF NEVADA

SAW CLAMP

Application filed March 28, 1929. Serial No. 350,472.

This invention relates to improvements in saw-clamps, and the main object of the invention is to produce a saw-clamp which will firmly and rigidly support the saw throughout its length and can be quickly and easily clamped and unclamped.

Another object of the invention is to provide a saw-clamp of low cost, which is of strong construction and effective in operation.

A further object of the invention is to provide convenient and effective means for fastening the saw-clamp to a support such as a work bench.

A further object of the invention is to provide means whereby the clamping means may be used to clamp and support a band-saw, as well as an ordinary hand saw.

The accompanying drawings illustrate my invention, and referring thereto:

Fig. 1 is a plan view of the clamp in position on a bench, with a hand saw mounted therein.

Fig. 2 is a side elevation thereof.

Fig. 3 is a section on line 3—3 in Fig. 1.

Fig. 4 is a section similar to Fig. 3, showing the parts in inoperative position.

Fig. 5 is a section on line 5—5 in Fig. 4.

Fig. 6 is a partly broken plan view of an end portion of the clamp in operative position.

Fig. 7 is a section on line 7—7 in Fig. 6.

Fig. 8 is a broken side elevation of an attachment for adapting the clamp for use on a band saw.

Fig. 9 is a view similar to Fig. 7, but with a band-saw mounted in the clamp instead of a hand saw.

My improved saw-clamp comprises two resilient clamp bars 1 and 2 each formed preferably of angle irons with their reentrant angles facing one another so that the saw may be clamped between the aligned upper and lower edges of the angle irons. Said bars 1 are normally sprung or bent outwardly at each end, so as to be normally held by their own resilience in the relative positions, shown in dotted lines in Fig. 1, and means are provided for forcing the end portions of the bars together to clamp the saw, such means consisting of U-shaped members 3, connected to the bars and composed of resilient metal, such as steel. One arm 3a of each member 3 is bent inwardly at a right angle, as shown, to form a pivot 4 which passes through a hole 5 in bar 1, and through a reenforcing plate 6 secured to bar 1. Said reenforcing plate abuts the upper and lower walls of bar 1, as shown at 35, and is bent outwardly at its ends, as at 36, the extremities 37 of the bent out portions projecting through bar 1, and being riveted or upset as shown at 38, to hold said reenforcing plate in position. A pivot screw 7 may pass through a hole 8 in the other arm 3b of the member 3, and engage in a tapped or threaded hole 9 in the bar 2, so that the member 3 can swing to raised or lowered position relative to the bars 1 and 2. A lug or enlargement 10 is formed in the arm 3b of each U-shaped member 3, and is adapted to engage the salient portion or outer edge of bar 2 to press end bar inwardly toward bar 1 when the members 3 are moved to lowered position alongside the bars 1 and 2 as shown in Fig. 1. An inward projection 11 is preferably formed on lug 10 to engage the top of bar 2 and act as a stop when the member 3 is moved to lowered position. The hole 5 through which the inwardly bent pivot portion 4 of each member 3 passes, is preferably located at the angle of bar 1, so as to provide a recess 5' in the upper wall of said bar, into which the arm 3a enters when the member 3 is raised. When said arm is lowered, however, the curved portion 40 of said arm engages the edge of said recess and forces bar 1 inwardly. Lowering of the U-shaped members 3 therefore forces bars 1 and 2 inwardly to clamp the saw, due to the combined effect of engagement of lug 10 with the outer edge of bar 2 and the engagement of arm 3a with the curved face of recess 5' and the outer edge of bar 1. The members 3 are preferably bent upwardly at their outer ends, as shown at 41, so as to accommodate a band-saw, as well as a hand saw, as hereinafter described.

In order to mount the saw-clamp on a work bench or other support, the bar 1 is formed or provided with brackets 12 rigidly secured thereto and projecting transversely therefrom, each bracket having a horizontal arm 13a adapted to rest on top of the bench and a vertical arm 13b adapted to extend down in front of the bench and formed with a prong or tooth 14 adapted to enter the bench indicated at 22. A dog member 15 has a pivot pin 16 extending through a slot 17 in bracket 12, and provided with a head 16' for retaining it in position, said dog member having a tooth or prong 18 adapted to enter the top of the bench. The outer end of dog member 11 is formed with an inclined or cam face 19 adapted to engage a shoulder 20 on bracket 12 to force the dog member toward the clamp bar 1 and thereby draw the clamp bar and bracket toward the work bench, when the dog member is forced from position shown in Fig. 4 to position shown in Fig. 3, so as to cause tooth 14 on the vertical arm 13 to enter the front of the bench at the same time that the tooth 19 on the dog member 16 enters the top of the bench. By this means the saw-clamp may be quickly positioned on the bench and may be mounted rigidly in position by simply driving down the dog member 16, for example, by means of a hammer.

The above described saw-clamp may be used as follows, the clamp having been mounted on the work bench indicated at 22 in the manner above described. The U-shaped members 3 are placed in an upright or raised position shown in Fig. 4 so as to remove the lugs 10 thereon from engagement with the clamp bar 2 and permit arms 3a thereof to enter recesses 5', and thus permit the clamp bars 1 and 2 to separate or spring apart to their normal outwardly bowed positions as shown in dotted lines in Fig. 1. The engagement of arm 3a in recess 5' serves to normally hold each of the members 3 in this raised position except when said members are forcibly lowered. The saw indicated at 23 is then inserted between the clamp bars 1 and 2 and the members 3 are then forced down to lowered position, to bring the ends of the arms 3a and 3b in substantial alignment with the outer edges of the clamp bars, as shown in full lines in Figs. 1 and 6, thus bringing the enlargement 10 on each member 3 into engagement with the clamp bar 2 and arm 3a into engagement with the salient edge of bar 1, and forcing said clamp bars toward one another against their own resilience in such manner as to clamp and firmly hold the saw between the upper and lower edges of the two clamp bars. It should be pointed out that the use of resilient clamp bars whose end portions are normally sprung or bent outwardly, together with operating members engaging said bars near the ends thereof, acts advantageously to grip the saw tightly throughout the length of said bars, due to the fact that the inward pressure of said operating members is exerted on the outwardly sprung portions and forces these portions into close engagement with the saw while the resilience of the clamp bars serves to also force the central portions of said bars into tight engagement with the saw. This is of very great practical advantage, since the usual purpose of such a clamp is to support the saw in position for setting, filing, or otherwise acting upon the teeth thereof, and for this purpose it is essential that all portions of the saw within the length of the clamp be held rigid so as to prevent flexing or chattering thereof during such setting, filing, or other operation. This device is, therefore, of marked advantage over previously known saw clamps in which the clamp bars normally extended substantially parallel to one another, and were also provided with operating means for forcing the same together near the respective ends thereof, since in any such construction the central portion of the saw would be held much less rigidly than the end portions. The stop or projection 11 on member 3 is adapted to engage the bar 2, as shown in Fig. 7, to limit the downward movement of each member 3 and prevent it from being moved too far. The saw is unclamped by reversing the above described operation.

My improved clamp can be adapted for use with band-saws by means of the attachment shown at 25 in Figs. 8 and 9, consisting of thin flexible metal bent in U-shape and adapted to be placed between upper and lower edges of the two clamp bars 1 and 2, and to receive the band-saw, indicated at 27, between the arms of member 25, each of said arms having a flange or projecting means 28 adapted to rest on top of the corresponding clamp bar to support the attachment. Two or more series of holes 29 are provided in member 25, and two pins or screws 30 are placed in said holes, the holes in each saw being arranged at different distances from the top of member 25, so that the pins or screws 30 placed therein will serve as stops or rests for the bottom of the band-saw and support the same in proper position for sharpening or setting the same. The upper edge of a band-saw mounted in this manner is also shown in dotted lines at 27' in Fig. 2, and it is evident that the operating members 3 can in that case be lowered only to the position indicated in dotted lines at 3' in said figure. For this reason, the arms 3a and 3b are preferably bent as at 41 just beyond the position at the enlargements 10, and the inner flat face of each of said enlargements is made of sufficient vertical extent so as to engage the salient angle of clamp bar 2 as shown in Fig. 9 and force the clamp bars inwardly, even when said operating members are only lowered to this intermediate position.

I claim:

1. In a saw clamp, two resilient clamp bars extending side by side and formed as angle irons with their salient angles outwardly disposed and their inner edges in alignment with one another, said clamp bars having their end portions bent outwardly from one another, a U-shaped operating member at each end of the clamp, one of said clamp bars adjacent each end having an opening at the angle thereof and one arm of each operating member being bent inwardly and extending through said opening, means pivotally connecting the arm of each operating member to the other clamp bar, and an inward projection on said other arm adapted to engage the outer edge of said other clamp bar upon movement of said operating member alongside the clamp bars.

2. In a saw-clamp the combination with clamp members and means for operating same to clamp a saw, means for mounting the clamp comprising brackets extending horizontally from one of said clamp members and a dog member pivotally and slidably mounted on said bracket and provided with a tooth adapted to engage the top of a suitable support, means for moving said bracket horizontally relative to said dog member on vertical movement of said dog member and tooth means on said bracket adapted to engage the suitable support when said bracket member is so moved.

3. A construction as set forth in claim 2 and comprising shoulder means on said bracket, and incline means on said dog member adapted to engage said shoulder means in downward movement of said dog member to move the bracket relative to the dog member.

4. In a saw-clamp, two clamp bars extending side by side and formed as angle irons with their salient angles outwardly disposed and their inner edges in alignment with one another, means secured to one of said clamp bars for mounting the same on a suitable support, a reenforcing plate mounted within said last mentioned clamp bar adjacent each end thereof, each of said reenforcing plates abutting the upper and lower walls of said clamp bar and having its ends bent outwardly and secured to said last mentioned clamp bar, openings in said last mentioned clamp bar and in each reenforcing plate aligned with one another, and a U-shaped operating member at each end of the clamp, each of said operating members having one arm bent inwardly at its end and passing through said openings, means pivotally connecting the other arm of each operating member to the other clamp bar, and means on said other arm adapted to engage said other clamp bar and force the same inwardly upon depression of said operating member.

5. In combination with two clamp bars and means for forcing them toward one another, a resilient U-shaped member extending between said clamp bars and having projecting means resting on top of the clamp bars, and stop means adjustably secured in said U-shaped member to engage and support the bottom of a band-saw.

6. In a saw clamp, two clamp bars extending side by side and formed as angle irons with their salient angles outwardly disposed and their inner edges in alignment with one another, means secured to one of said clamp bars for mounting same on a suitable support, said clamp bars being provided with openings extending therethrough adjacent the salient angles near the opposite ends of said bars, said openings in the respective bars being in alignment with one another, a reenforcing plate mounted within one of the clamp bars adjacent the openings therein, each of said reenforcing plates being provided with an opening in alignment with the openings in the respective clamp bars, and a U-shaped operating member at each end of the clamp, each of said operating members having inwardly extending pivot means adjacent the end of each arm thereof, said pivot means on one arm of each operating member extending through said aligned openings in the reenforcing plate and the clamp bar in which said plate is mounted, and said pivot means on the other arm of each operating member extending inwardly through said openings in the other clamp bar, and said U-shaped operating member being provided with means adapted to engage the salient angles of said clamp bars and force the same inwardly upon depression of said operating members.

In testimony whereof I have hereunto subscribed my name this 20th day of March, 1929.

JOHN A. WALLER.